(12) United States Patent
Schneider

(10) Patent No.: US 9,163,700 B2
(45) Date of Patent: Oct. 20, 2015

(54) DRIVE UNIT FOR ACTUATOR DRIVE INCLUDING AN ELECTRIC MOTOR AND ACTUATOR DRIVE

(71) Applicant: Minebea Co., Ltd., Nagano (JP)

(72) Inventor: Helmut Schneider, Zimmern-Floezlingen (DE)

(73) Assignee: Minebea Co., LTD., Kitasaku-Gun, Nagano (JP)

( * ) Notice: Subject to any disclaimer, the term of this patent is extended or adjusted under 35 U.S.C. 154(b) by 434 days.

(21) Appl. No.: 13/664,933

(22) Filed: Oct. 31, 2012

(65) Prior Publication Data

US 2013/0104682 A1 May 2, 2013

(30) Foreign Application Priority Data

Oct. 31, 2011 (DE) .......................... 10 2011 054 956

(51) Int. Cl.
*F16H 1/20* (2006.01)
*F16H 1/22* (2006.01)
*F16H 57/021* (2012.01)
*H02K 7/116* (2006.01)
*H02K 1/27* (2006.01)
*F16H 57/02* (2012.01)

(52) U.S. Cl.
CPC .. *F16H 1/20* (2013.01); *F16H 1/22* (2013.01); *F16H 57/021* (2013.01); *H02K 1/278* (2013.01); *H02K 7/116* (2013.01); *F16H 2057/02082* (2013.01); *Y10T 74/19684* (2015.01)

(58) Field of Classification Search
CPC .............. F16H 1/20; F16H 1/206; F16H 1/22
USPC ..... 74/665 F, 665 G, 665 D, 665 E, 412, 413, 74/414 R
See application file for complete search history.

(56) References Cited

U.S. PATENT DOCUMENTS

| | | | | |
|---|---|---|---|---|
| 4,312,244 A | * | 1/1982 | Barnes et al. ................... | 74/410 |
| 4,337,910 A | * | 7/1982 | Santoro ....................... | 242/338.4 |
| 4,369,387 A | * | 1/1983 | Haar et al. ..................... | 310/83 |
| 4,444,071 A | * | 4/1984 | Guichard ........................ | 74/427 |

(Continued)

FOREIGN PATENT DOCUMENTS

| | | |
|---|---|---|
| DE | 19547513 C1 | 6/1997 |
| DE | 19514361 C2 | 5/2000 |

(Continued)

*Primary Examiner* — David M Fenstermacher
(74) *Attorney, Agent, or Firm* — Grossman, Tucker, Perreault & Pfleger, PLLC

(57) ABSTRACT

A drive unit for an actuator having an electric motor, wherein the drive unit comprises a gear train having at least a first gear stage and a last gear stage, wherein the gear train realizes a transmission ratio of greater than one from the electric motor to an output wheel, wherein each gear stage is formed by a gear drive and wherein in the last gear stage, one gear wheel or alternatively two gear wheels connected in parallel are provided that each mesh with an upstream gear wheel of the gear train and with the output wheel, so as to transmit the torque acting on the last gear stage to this stage via the one gear wheel or alternatively distributed over the two gear wheels connected in parallel, wherein the drive unit is accommodated in a housing of the actuator that has at least a first and a second bearing support for the gear wheels of the last gear stage, and to form this last gear stage, the two bearing supports are fitted with the one gear wheel or alternatively with the two gear wheels connected in parallel.

12 Claims, 7 Drawing Sheets

(56) References Cited

U.S. PATENT DOCUMENTS

| | | | |
|---|---|---|---|
| 4,723,184 A * | 2/1988 | Takai et al. | 360/96.3 |
| 4,754,660 A * | 7/1988 | Kobayashi et al. | 74/427 |
| 4,944,375 A * | 7/1990 | Ohta et al. | 192/223.2 |
| 5,528,960 A | 6/1996 | Nagao et al. | |
| 5,875,681 A | 3/1999 | Gerrand et al. | |
| 5,905,927 A * | 5/1999 | Inoue et al. | 399/167 |
| 6,404,084 B1 * | 6/2002 | Niki et al. | 310/75 R |
| 6,577,034 B1 | 6/2003 | Kitamura et al. | |
| 8,186,238 B2 * | 5/2012 | Allen | 74/354 |
| 8,397,603 B2 * | 3/2013 | Gmirya | 74/665 GA |

FOREIGN PATENT DOCUMENTS

| | | |
|---|---|---|
| DE | 19981897 T1 | 3/2001 |
| DE | 10101609 A1 | 7/2002 |
| DE | 69706579 T2 | 7/2002 |
| DE | 102005028372 A1 | 12/2006 |
| DE | 102008038069 A1 | 2/2010 |

* cited by examiner

DRIVE UNIT FOR ACTUATOR DRIVE INCLUDING AN ELECTRIC MOTOR AND ACTUATOR DRIVE

FIELD OF THE INVENTION

The invention relates to a drive unit for an actuator having an electric motor as well as an associated actuator.

BACKGROUND

One field of application of the invention is in actuators having small motors that have a compact construction and a light weight, particularly having small-scale brushless DC motors which are used in the automotive industry, for example, as a small motor actuator, a fan motor, a drive for flap actuators used, for example, in air conditioning units and for cooling the motor etc., the invention not being limited to these applications.

The drive unit according to the invention is particularly suitable for those kinds of actuators that, compared to the rotational speed of the electric motor, generate a slow movement of the actuator, such as in a ventilation flap. Brushless DC motors may be used as the drive motor that can generate a rotational speed of the drive shaft of up to some 4000 rpm, for example, in the range of 500 to 2500 rpm, whereas the required rotational speed at the output side for the flap actuator is, for example, in the range of 3 to 10 rpm. The required torque is in the range, for example, of 1 to 2 Nm. In these kinds of actuators, the drive unit has to thus generate a transmission ratio of greater than 1 (gear reduction) between the drive and output side, where the transmission ratio lies, for example, in the range of 2 to 8 or of 4 to 5 per gear stage, i.e. $4 \leq i \leq 5$ for $i = z_{output}/z_{drive}$, where z indicates the number of teeth in the gear wheels of a gear stage. The transmitted torque acts conversely to the rotational speed. The lower the rotational speed on the output side in relation to the rotational speed on the drive side, the higher the increase in torque from the drive to the output side.

In practice, for these kinds of drive units that use multi-stage gearing, there arises the problem that the overall torque transmissible by the actuator—alongside the electric motor—is determined by the gear stage that is subject to the greatest load, i.e. the gear stage directly before the output side. In theory, the gear stages have to be designed in terms of strength in relation to the transmission ratio from one gear stage to the next, which means that the gear wheels of higher gear stages have to be made of a resilient material having thicker shafts and/or have measures for stabilizing the teeth. The transmission of an increasing torque from one gear stage to the next results in a greater load on the individual gear wheels, particularly the teeth, as well as in greater deflection of the shaft of the respective higher gear stages and of the output side. The gear unit has thus to be designed such that it can withstand the increasing load in the higher gear stages. One method, for example, is to make the shafts thicker although this requires more installation space. Another method is to make the gear wheels of the last gear stage and those on the output side not only more stable in themselves, but also in their connection to the shaft. For this purpose, they can be made bigger and/or out of more high-quality, stable plastics or possibly provided with metal bushings that are molded, for example, into the gear wheels as an insert in a metal injection-molding process. However, these solutions are complex and expensive, they increase space requirements and possibly lead to new problems caused by the combination of materials when using different plastics and/or metals.

From the prior art, transmissions having power splitting are basically known that have two counter shafts whose gear wheels mesh with a common first gear wheel as in DE 10 2008 038 069 A1. From DE 195 14 361 C2 a torque splitting device for the even distribution of torque to a first drive shaft and a second drive shaft is known, where two identical toothed gear wheels mesh with a gear wheel. The former document finds application in wind power plants where the slow rotational speed of the main rotor has to be transformed into a fast generator speed. The field of application for the second document is in the area of helicopters, so as to transmit the rotational movement that is generated by a motor to the main rotor of the helicopter. These documents certainly show that, for the transmission of power in a gear unit, it is basically known to distribute the torque to two gear wheels, however, these documents do not provide a suitable solution for an actuator based on small motors.

From DE 195 47 513 C2, an adjuster for vehicle seats is known having a pivoting operating lever that is fixedly connected to a toothed area that in its center position engages simultaneously with two axially parallel gear wheels. These gear wheels are connected through oppositely aligned freewheels to aligned gear wheels that mesh with a common output wheel. On moving the operating lever out of its center position, this toothed area only engages with one of the two parallel gear wheels, so as to increase the pivotal range of the lever. Again the solution described in this document is not suitable for an actuator based on an electric motor; it is limited to a manual lever adjustment.

It is an object of the invention to provide a drive unit for an actuator based on an electric motor that realizes a transmission ratio greater than one from the drive wheel of the electric motor to the output side over a plurality of gear stages, wherein the drive unit is to be optimized for the torque it has to transmit.

SUMMARY

The invention provides a drive unit for an actuator having an electric motor that comprises a gear train having at least one first gear stage and a last gear stage which realizes a transmission ratio greater than one from the electric motor to an output wheel. Each gear stage is formed by a gear drive, where in the last gear stage one gear wheel or alternatively two gear wheels connected in parallel are provided, each meshing with an upstream gear wheel of the gear train and with the output wheel, so as to transmit the torque acting on the last gear stage to this stage via the one gear wheel or alternatively distributed over the two gear wheels connected in parallel. In order to provide the one or alternatively the two gear wheels connected in parallel in the drive unit, the drive unit is accommodated in a housing of the actuator that has at least one first and one second bearing support for the gear wheels of the last gear stage. To form this last gear stage, these two bearing supports are fitted with only the one gear wheel or alternatively with the two gear wheels connected in parallel. The invention thus provides a drive unit having a gear train in which the last gear stage may be alternatively fitted with one gear wheel or with two gear wheels connected in parallel. For this purpose, two bearing supports are always provided of which, however, only one or both may be used according to requirements. In this way, the invention creates a variable drive unit, which, depending on the expected load on the output side, can be variably fitted with one gear wheel or two parallel gear wheels. The gear wheels may be made of the same material, have the same or a similar shaft diameter and have the same or a similar tooth geometry as the gear wheels of the upstream gear stages because the increased load of the last gear stage can be compensated, where needed, in that in the last gear stage the torque is transmitted not only by one gear wheel but also by the two gear wheels connected in parallel. This makes it possible for the drive unit to be adapted to the requirements of the actuator and flexibly fitted with two gear wheels for transmitting higher torque on the output side and with only one gear wheel for transmitting lower torque. On the one hand, this results in cost savings since the entire gear train can largely be constructed with uniform gear wheels. On the other hand, the provision of the two gear wheels connected in parallel in the last gear stage may even lead to space saving since, for the transmission of maximum torque, there is no longer need to give a single gear wheel of the last gear stage a more robust shaft design, for example, which would require the bearing supports to be adapted accordingly. There is no need to use high-quality and thus more expensive materials nor any need for additional reinforcing measures such as bushing the gear wheels etc.

The invention is particularly advantageous in such applications in which, between the last gear stage and the output wheel, a transmission ratio greater than one is again provided, in which the output wheel thus rotates slower than the gear wheel or the gear wheels of the last gear stage respectively.

In one embodiment of the invention, the gear wheels are spur gears, the gear unit thus being a spur gear unit.

It is particularly expedient if the two gear wheels connected in parallel of the last gear stage are identical, since this ensures uniform distribution of the torque to both gear wheels and thus a uniform load on the gear wheels.

According to the invention, at least the two bearing supports for the gear wheels of the last gear stage are provided in the housing of the actuator. The housing of the actuator may be configured such that it can receive the entire gear train and position the gear wheels of the individual gear stages with respect to one another and with respect to the electric motor. To this end, the housing of the actuator has bearing supports on its inner wall for the purpose of supporting the axles of the gear wheels. The bearing supports may, for example, contain pins onto which the gear wheels are placed.

Further means of fastening, such as pins, for positioning and fixing other functional units, such as a circuit board, may be integrally molded in the housing of the actuator according to the invention. This produces a particularly compact actuator.

According to the invention, a can may furthermore be integrally molded to the inner face of the housing of the actuator, the can receiving the electric motor, means of fastening which may be integrally molded to the can, so as to position the electric motor accommodated in the can and particularly to fix it rigidly against turning. This also contributes to producing a compact actuator. The can may be dimensioned such that it tightly encloses the outside circumference of the electric motor and forms a motor housing.

In the drive unit according to the invention, the gear train is configured, for example, such that each gear stage realizes a transmission ratio in the magnitude of 2 to 8, or of 4 to 5.

The invention also provides an actuating drive for a flap actuator in a motor vehicle having a drive unit according to the above description. As the electric motor, the actuator may comprise a brushless DC motor whose outside circumference is less than or equal to 60 mm, or less than or equal to 30 mm.

DESCRIPTION OF DRAWINGS

The invention is described in more detail below on the basis of embodiments with reference to the drawings. The figures show.

DESCRIPTION OF EMBODIMENTS

Figure 1:
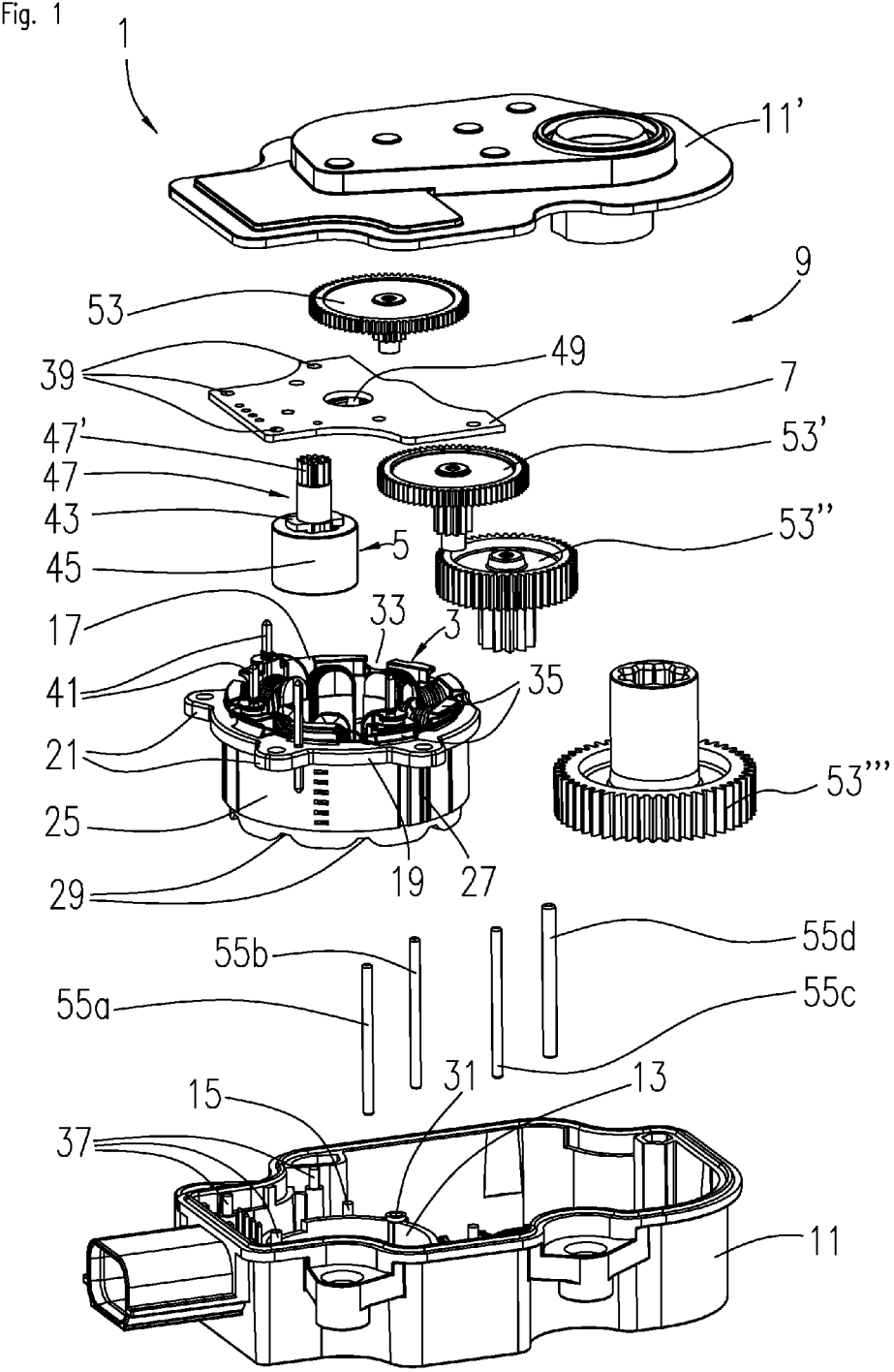
FIG. 1 an exploded view of an actuator according to an embodiment of the present invention, the last stage of the gear train being fitted with only one gear wheel, FIGS. 2a and 2b a view from below and a perspective view of the housing of the actuator having a mounted stator according to an embodiment of the invention, FIGS. 3a to 3c a longitudinal section through a rotor as well as a perspective view and a front view of the rotor as can be used in an actuator according to an embodiment of the invention, FIG. 4 an exploded view of the drive unit according to an embodiment of the invention, the last stage of the gear train being fitted with two gear wheels connected in parallel, and FIG. 5 a bottom view of the drive unit of FIG. 4, FIG. 6 a view from above of the drive unit of FIG. 4, and FIG. 7 a perspective view of the last stages of the gear train of the drive unit according to the invention having two gear wheels connected in parallel.

FIG. 1 shows an actuator according to an embodiment of the present invention in an exploded view. The actuator 1 has a DC motor having a stator 3 and a rotor 5, a circuit board 7 for controlling the DC motor and a gear unit 9 that is driven by the DC motor. The DC motor, the circuit board 7 and the gear unit 9 are disposed in a housing 11 that can be closed by a cover 11'. The cover 11' can additionally have a seal so as to protect the interior of the actuator 1 against soiling and other external influences.

The DC motor is accommodated in the housing 11 in a can 13 that is integrally molded to an inner face of the housing 11. The can 13 has an inside diameter that largely corresponds to the outside diameter of the stator 3 so that the can 13 tightly encloses the stator 3. Pins 15 are integrally molded to the can 13 for the purpose of positioning and fixing the DC motor. The stator 3 is provided with slot insulation 17 that has on an end face a flange 19 to which mounting ears 21 are integrally molded that project from the outside circumference of the slot insulation 17 in a radial direction. The pins 15 are led through the mounting ears 21 in order to position the stator 3 in the can 13 with respect to the housing 11 and to fix it to the housing 11. The pins 15 are formed on the rim of the can 13 such that the rim of the can forms a supporting surface for the flange 19 and the mounting ears 21 of the slot insulation 17 and the pins 15 are led through the mounting ears 21. This goes to safeguard the stator 3 against any radial displacement and against turning. The pins 15 led through the mounting ears 21 may, for example, be hot caulked so that the stator 3 can also be safeguarded against any axial displacement.

To attach the DC motor to the housing 11, the stator 3 is directly positioned with respect to the housing 11 using the can 13 and the integrally molded pins 15 and fixed to the housing 11. This makes mounting the DC motor in the housing 11 considerably more simple.

The support for the stator 3 may be further optimized in that a longitudinal groove 27 is provided in a back yoke ring 25 of the stator 3 into which a corresponding projection (not illustrated) on the inner wall of the can 13 can be guided. What is more, evenly spaced depressions 29 are formed on a bottom end face of the slot insulation 17 opposing the bottom of the can in the region of the stator slots, into which appropriately formed projections (not illustrated) in the bottom of the can 13 may engage. The depressions 29 as well as the longitudinal groove 27 safeguard the stator 3 against turning in the can 13 in addition to the mounting ears 21 of the slot insulation 17.

In order to simplify mounting and adjusting the stator 3 and thus the DC motor in the can 13, a bearing support 31 for a shaft or an axle of the first stage of the gear unit 9 is formed on the side wall of the can 13. The flange 19 of the slot insulation 17 accordingly has a recess 33 which at least partially encloses the bearing support 31 when the stator 3 is set in the can 13. This goes to ensure that the stator 3 inserted in the can 13 always assumes a predetermined orientation. Moreover the bearing contained in the bearing support 31 additionally safeguards the stator 3 against turning via the slot insulation 17.

The DC motor is additionally attached with the aid of the circuit board 7 that rests on the end face of the slot insulation 17 and thus secures the stator 3 in an axial direction. The circuit board 7 is attached to the housing 11 using bars 37 that form a supporting surface for the circuit board 7, with pins of the bars 37 engaging in corresponding openings 39 in the circuit board. The ends of the pins may be hot caulked so as to permanently fix the circuit board 7. However, the invention is not limited in this respect. So that instead of hot-caulked pins, other positive-fit and/or force-fit connections, such as snap-in connectors and press-fit pins may be used. On its end face facing the circuit board 7, the slot insulation 17 has a series of L-shaped projections 35 that act as wire guides for the coil wires.

The electrical contact between the circuit board 7 and the stator 3 is effected using connector pins 41 that are pressed into the projections 35 of the slot insulation 17 and extend in an axial direction from the end face of the slot insulation 17. The connector pins 41 are led through corresponding openings in the circuit board 7 and soldered on there. The connector pins 41 are in turn connected to the respective coils of the stator 3 so as to establish electrical contact between the circuit board 7 and the coils of the stator 3.

Alongside a processing unit, the circuit board 7 may include a plurality of sensors that determine the rotational position of the rotor 5. For example, at least one Hall sensor may be disposed on the circuit board 7 to directly measure the axial leakage field of the rotor 5. The circuit board 7 may furthermore have an interface for communication and/or power supply, such as a connection to any data bus or a specialized field bus like the LIN bus.

The rotor 5 comprises a magnet carrier 43 on which an annular permanent magnet 45 is disposed. The magnet carrier 43 is integrally formed with a shaft 47 which is led through an opening 49 in the circuit board 7. The shaft 47 has a gear wheel 47' that drives the downstream gear unit 9. In the illustrated embodiment, the gear unit 9 is formed from a gear train having four gear stages, in the illustrated embodiment the last gear stage being fitted with only one gear wheel. The first gear stage is formed by the gear wheel 47' on the shaft 47 of the DC motor in conjunction with a first gear wheel 53. A second gear stage is formed by the first and a second gear wheel 53, 53', a third gear stage is formed by the second and a third gear wheel 53', 53'', and a fourth gear stage is formed by the third gear wheel 53'' and an output wheel 53'''. The first gear wheel 53, the second gear wheel 53' and the third gear wheel 53'' are each formed as double gear wheels, where a gear wheel having a low number of teeth meshes with a downstream gear wheel having a higher number of teeth, so as to achieve the desired transmission ratio of greater than one. In the illustrated embodiment, the shaft 47 of the DC motor as well as the double gear wheels 53, 53' and 53'' are supported on pins/axles 55a, 55b, 55c and 55d, the axle 55a being disposed in the can 13 and the axle 55b in the bearing support 31 in the side wall of the can 13. The axles 55c and 55d are held in bearings on the inner wall of the housing 11. Moreover, the shaft of the gear wheel 53''' is directly supported in a bearing support 62 in the housing 11.

The rotational speed of the rotor 5 can, for example, be up to 4,000 rpm and may lie in the range of 500 to 2,500 rpm, in order, with the illustrated actuator 1, to generate a rotational speed at the output side of, for example, 3 to 10 rpm and a torque of some 1 to 2 Nm. One field of application of the invention is in the automotive industry for controlling flap actuators, for example, in air conditioning units, the present invention not being restricted to this application. Depending on the torque required at the output wheel 53''', in the last gear stage one or two double gear wheels 53'' may be provided, as is made clear with reference to FIGS. 2a and 2b as described below. In the example illustrated in FIG. 1, however, only one double gear wheel 53'' is used in the last gear stage.

Figure 2A:
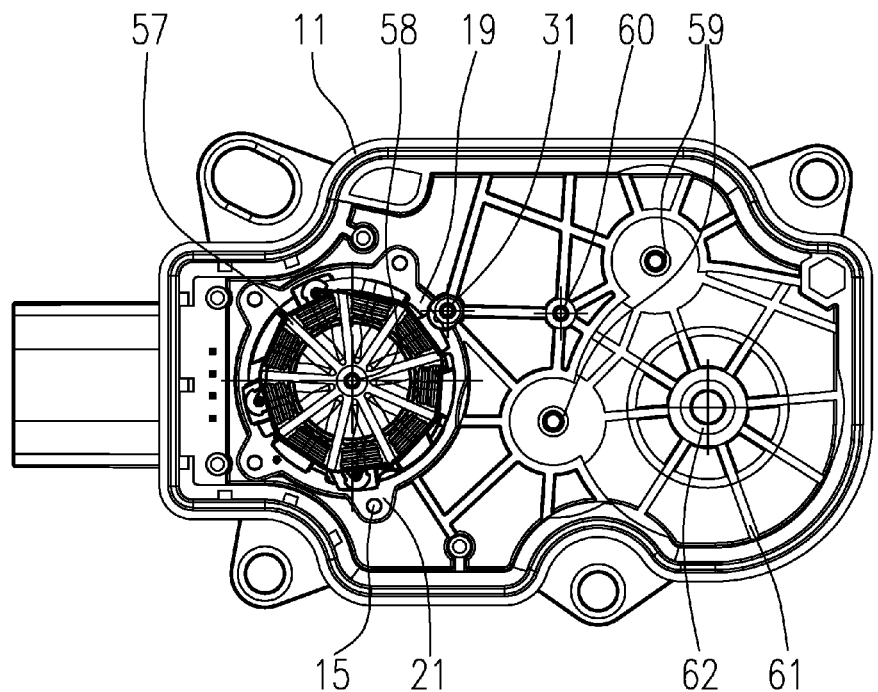
Figure 2B:
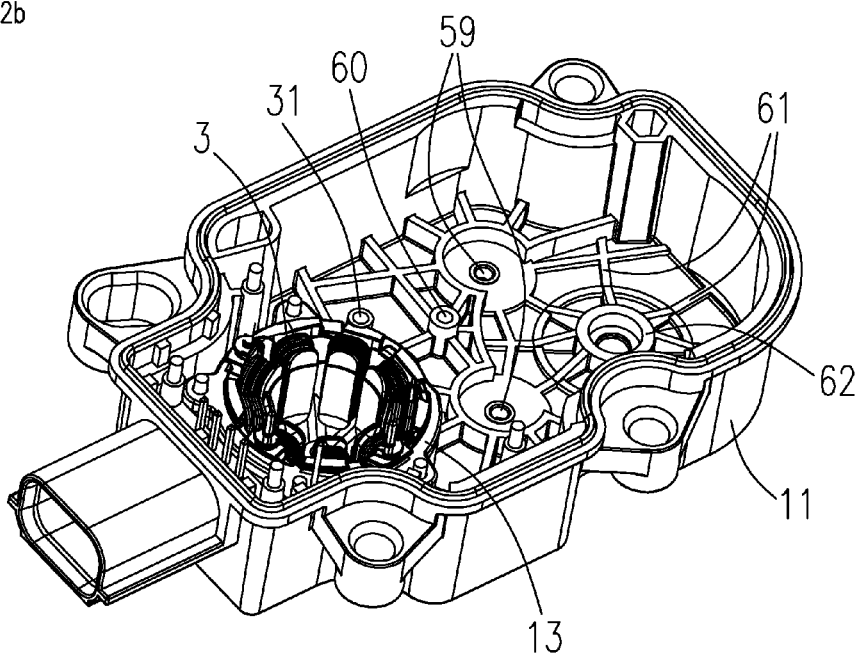

The housing 11 of the actuator 1 according to the embodiment of the invention illustrated in FIG. 1 is shown in a view from below and in a perspective view in FIG. 2a or 2b respectively. As can be seen in FIGS. 2a and 2b, the stator 3 is set in the can 13 of the housing 11, the flange 19 resting on the rim of the can 13 and the pins 15 engaging through the mounting ears 21. In the bottom of the can 13, a number of radially aligned struts 57 are formed which engage into the bottom depressions 29 of the slot insulation 17, so as to safeguard the stator 3 against turning in the can 13. Alongside the bearing support 31, the bearing support 58 for the axle 55a of the shaft 47 is moreover shown in the bottom of the can 13. In the bottom of the housing 11, two bearing supports 59 are furthermore provided for the sliding bearing formed between a first axle 55d and a first double gear wheel 53'' of the last gear stage as well as between a second axle (not illustrated) and a second double gear wheel (not illustrated) of the last gear stage. In addition, through the contact between the bottom and the axles, an axial bearing is formed in each of the bearing supports 59. In the embodiment shown in FIG. 1, only one of the bearing supports 59 is fitted with an axle 55d and an associated double gear wheel 53'', in order to transmit the rotational movement of the last gear stage to the output wheel 53'''. According to the invention, however, it is possible for both bearing supports 59 to be fitted with appropriate axles and double gear wheels 53'', the two double gear wheels 53'' (see also FIGS. 4 to 7) being connected in parallel and meshing not only with the double gear wheel 53' of the upstream gear stage but also with the output wheel 53'''. The second bearing support 59 is is fitted with a double gear wheel 53'' of the last gear stage if a torque is to be transmitted that lies over a limiting value, in the present embodiment, for example, over 1.5 Nm. In FIGS. 2a and 2b, a bearing support 60 is moreover shown for the axle 55c for receiving the second double gear wheel 53' that is also formed in the bottom of the housing 11. A bearing support 62 for the output wheel 53''' is likewise formed in the bottom of the housing 11. The bottom of the housing 11 is reinforced by struts 61 that extend radially to the axles 55b, 55c, 55d and the related bearings.

FIGS. 1, 2a and 2b together thus show that the drive unit according to the invention is designed to be operated with one or two double gear wheels in the last gear stage, making it possible to transmit a higher or lower torque according to needs. The two double gear wheels 53'' of the last gear stage may be identical in design so as to distribute the torque evenly between the two gear wheels and to keep the cost of manufacturing the drive unit low.

Figure 3A:
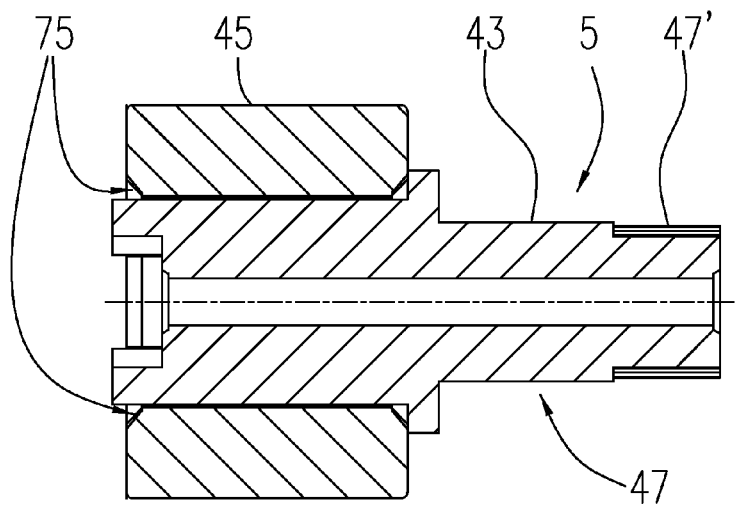
Figure 3B:
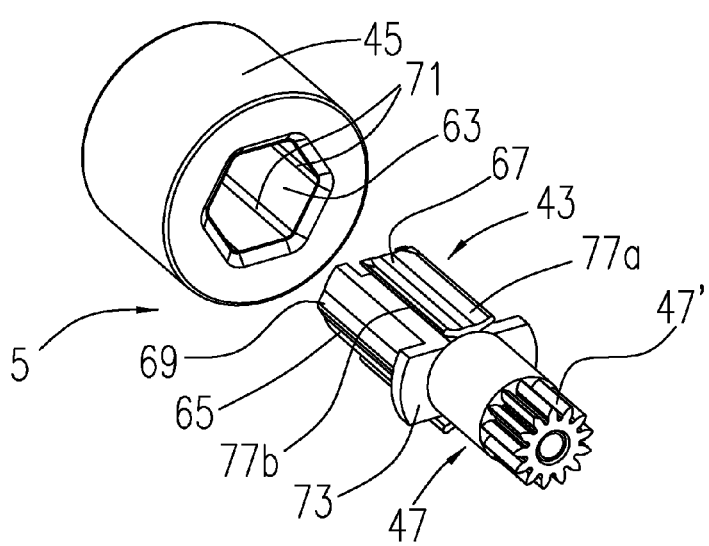

FIGS. 3a and 3b show a section through and an exploded view of a rotor as can be used in an actuator according to an embodiment of the present invention. Corresponding components are accordingly indicated by the same reference numbers as in FIG. 1. The rotor 5 has a magnet carrier 43 taking the form of a hollow shaft and a circular cylindrical permanent magnet 45 in which a recess 63 is provided through which the magnet carrier 43 can be guided so as to connect the shaft 47 to the permanent magnet 45. Such a two-piece embodiment for the rotor 5 is particularly more cost-effective for medium-sized manufacture with a production rate of less than 1 million pieces a year than, for example, one-piece manufacture.

In the illustrated embodiment of the rotor 5, the recess 63 through the permanent magnet 45 is designed as a hexagonal recess. However, the recess 63 could also take the form of any other polygonal recess or it may have an oval contour or any other non-circular contour. For its connection to the permanent magnet 45, the magnet carrier 43 has at least one first connecting element 65 that establishes a positive fit with the recess 63 in the permanent magnet 45, as well as at least one second connecting element 67 that establishes a force fit between the magnet carrier 43 and the permanent magnet 45.

The positive fit involving the first connecting element 65 is established in particular using line contact that is produced through a projecting rib 69 which is formed in the first connecting element 65 parallel to the axis of the shaft and which engages in an edge 71 of the recess 63. The projecting rib 69 may be high enough to allow a gap to be formed between the adjacent surfaces of the first connecting element 65 and the surfaces of the recess 63 adjacent to the edge 71, so that the adjacent surfaces do not rest against each other at all or only to a very small extent. In addition, the edge 71 of the recess 63 may itself be chamfered so as to create a space between the surfaces of the first connecting element 65 and the recess 63. This particularly advantageous embodiment of the first connecting element 65 reduces the risk of jamming when the two components of the rotor 5 are assembled, thanks to the small overlap.

The first connecting element 65 is bounded at one end by a projection 73 that extends in a radial direction from the shaft 47 and forms a supporting surface for the permanent magnet 45 mounted onto the magnet carrier 43. The first connecting element 65 is longer than the recess 63, so that the first connecting element 65 fully inserted into the recess 63 projects slightly out of the permanent magnet 45 in an axial direction and may be hot caulked, for example, at the end face of the permanent magnet 45 in order to fix the magnet carrier 43 to the permanent magnet 45. For this purpose, the permanent magnet 45 has a chamfer 75 at the rim of the recess 63 that can receive the material of the first connecting element 65 displaced by the hot-caulking process. As an alternative or in addition, the magnet carrier 43 may have clips or other means of fastening to fix the magnet carrier 43 axially to the permanent magnet 45. Irrespective of the way in which the magnet carrier 43 is axially fixed to the permanent magnet 45, the first and second connecting elements 65, 67 as provided can effectively solve the problem of distortion during assembly of the rotor.

The second connecting element 67 that establishes a force fit with the permanent magnet 45 may be designed as a bending or locking element. As shown in FIG. 3b, the second connecting element 67 comprises two adjacent wings 77a and 77b and a bar extending parallel to the axis of the shaft and projecting radially that connects the wings 77a and 77b in the manner of a Y profile. When the magnet carrier 43 is thus inserted into the permanent magnet 45, the wings 77a and 77b exert pressure at their exposed longitudinal ends on the adjacent surfaces of the recess 63, the pressure being high enough to hold the magnet carrier 43 in the permanent magnet 45 but low enough to allow the magnet carrier 43 to be inserted manually into the permanent magnet 45. Alternatively, the wings 77a and 77b may be dimensioned such that the exposed longitudinal ends engage in the edges 71 of the recess 63 or in corresponding chamfers of the edges 71 and thus exert pressure on the permanent magnet 45.

The second connecting element 67 thus allows a force fit to be established, alongside the positive fit, in a particularly advantageous way, the force fit compensating for the radial play that occurs due to manufacturing tolerances. Particularly with regard to the connections known in the prior art using a press fit and injection molding of the magnet carrier 43, the illustrated positive-fit and force-fit connection allows simpler mounting and increased resilience in operation.

Figure 3C:
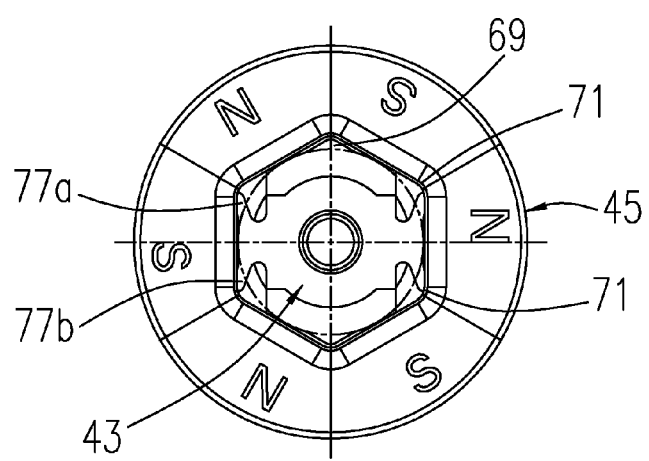

In the illustrated embodiment, the magnet carrier 43 may comprise two opposing first connecting elements 65 and added to this two opposing second connecting elements 67 offset by 90°, so that in the illustrated hexagonal recess 63, the ribs 69 are inserted into the opposing edges 71 of the recess 63 and the bars of the second connecting elements 67 are positioned in the middle and perpendicular to a surface of the recess 63. If the wings 77a, 77b are made wide enough, each edge 71 of the recess 63 is then connected to the magnet carrier 43 in either a positive fit or a force fit, as shown in FIG. 3c.

The permanent magnet 45 may be manufactured as an injection-molded magnet or as a pressed sintered magnet. The polarization of the permanent magnet 45 may be adapted to the recess 63 such that if the recess 63 has a polygonal contour, the pole transitions of the permanent magnet 45 are formed at the edges 71 or narrow areas between the recess 63 and the outer wall of the permanent magnet 45, as shown in FIG. 3c. For example, for a hexagonal recess, a six-pole permanent magnet is then provided. The magnet carrier 43 may be manufactured in one piece in an injection-molding process using a thermoplastic material.

Figure 4:
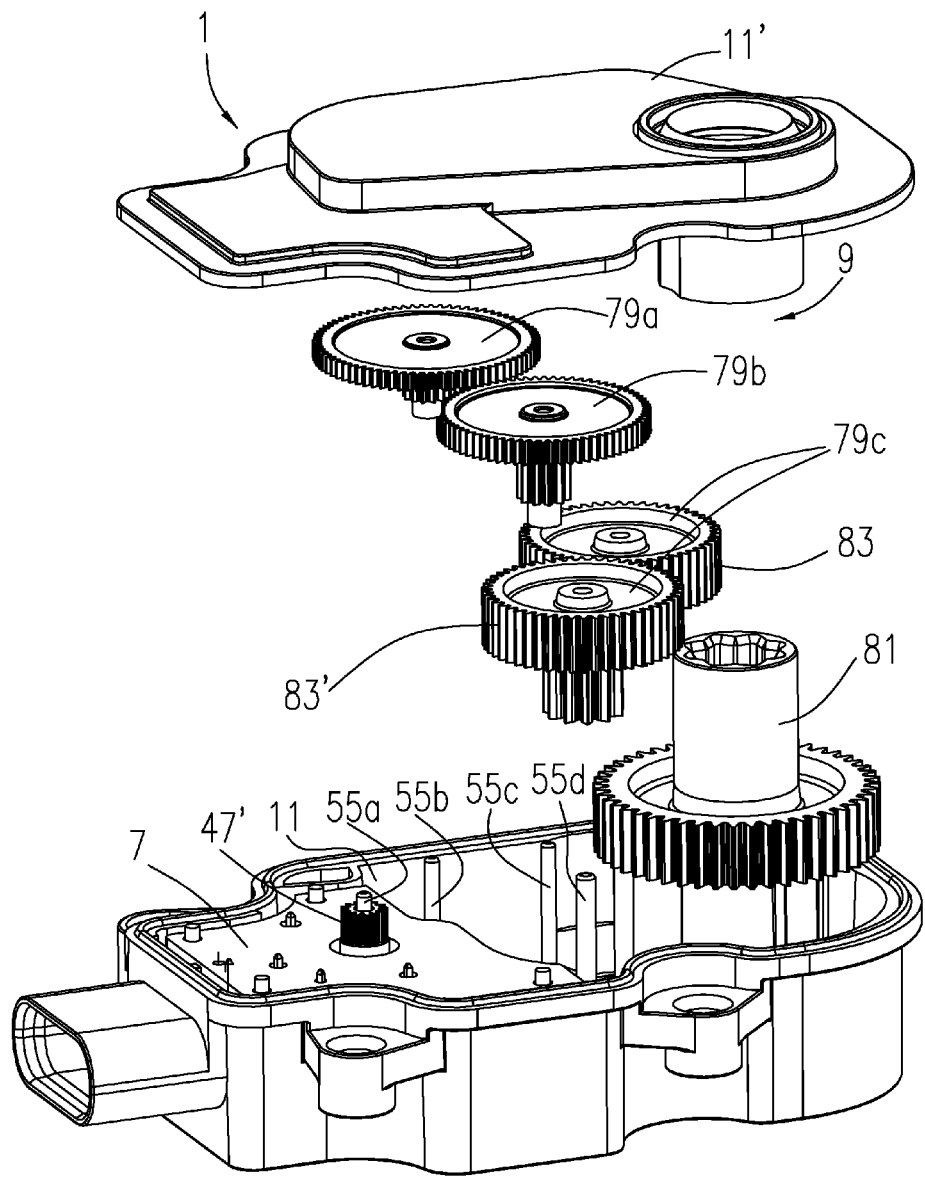
Figure 5:
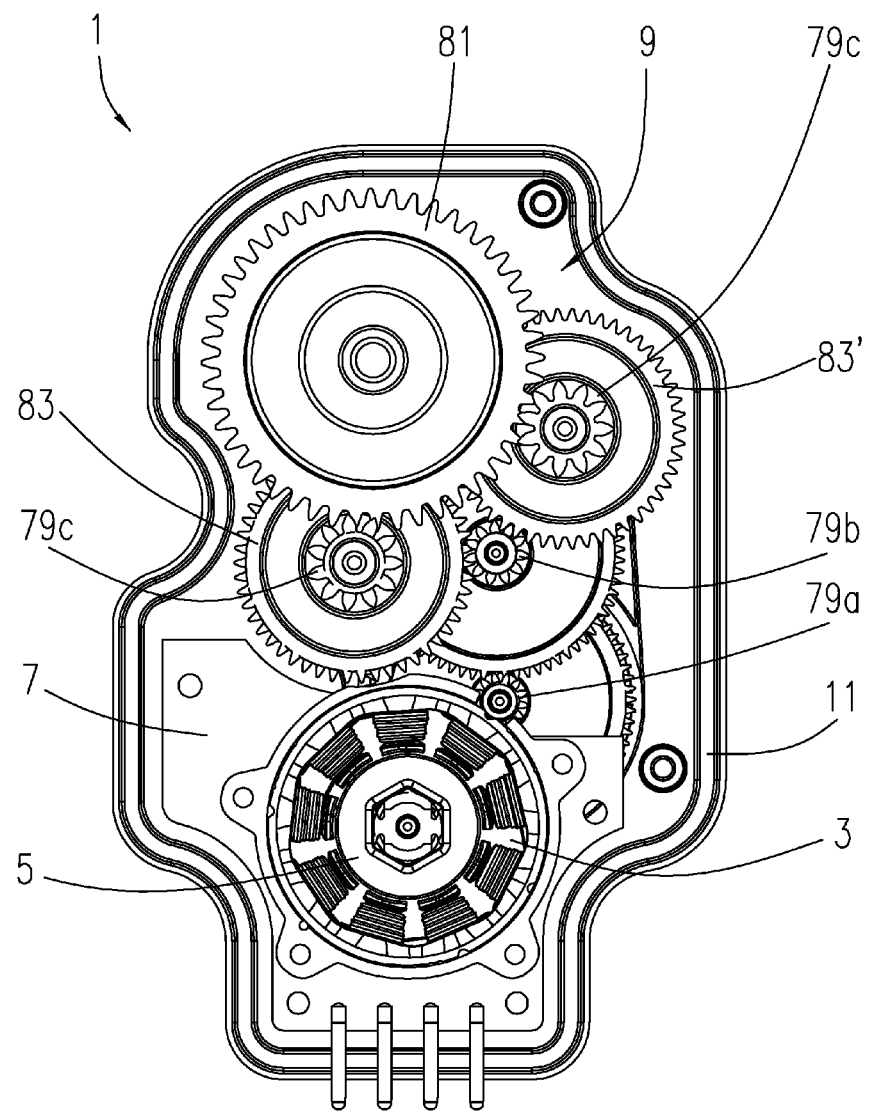
Figure 6:
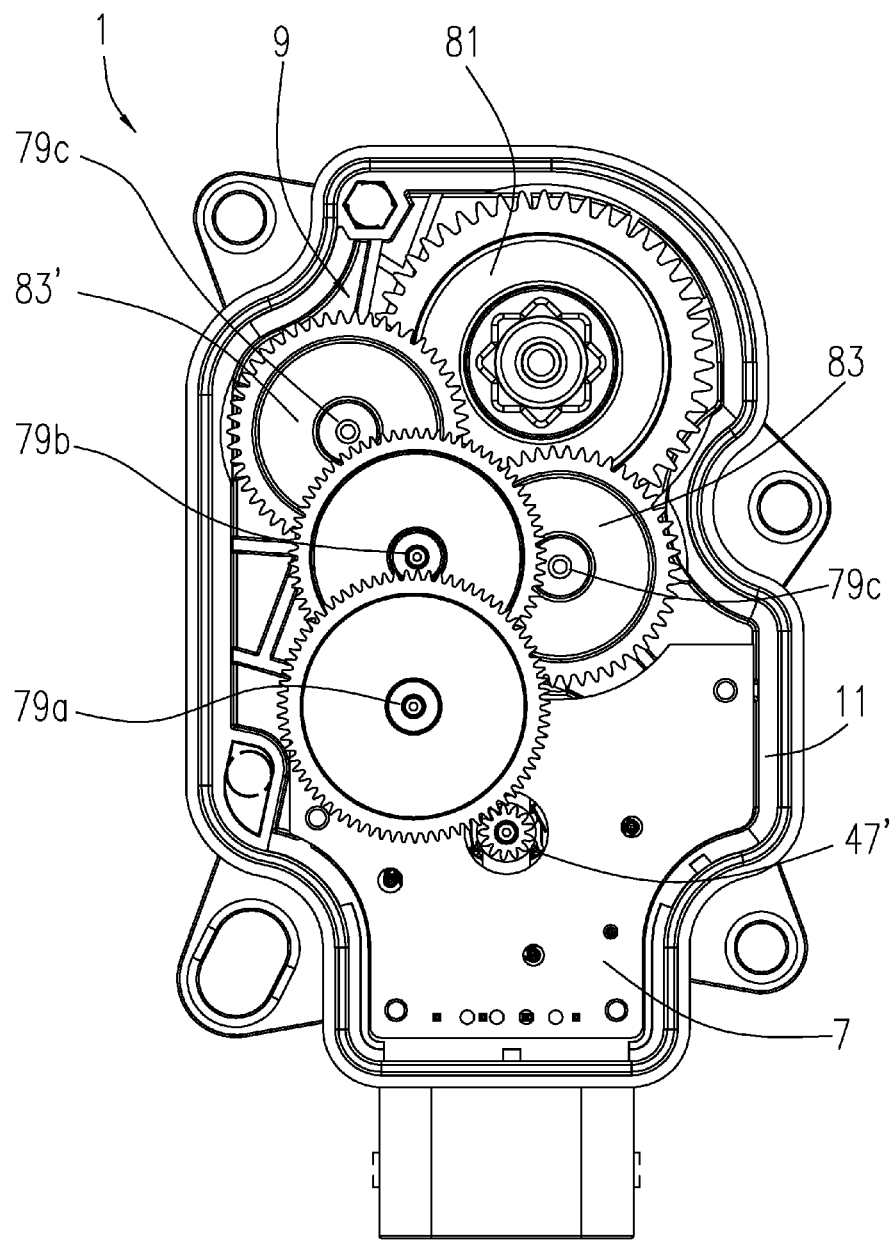
Figure 7:
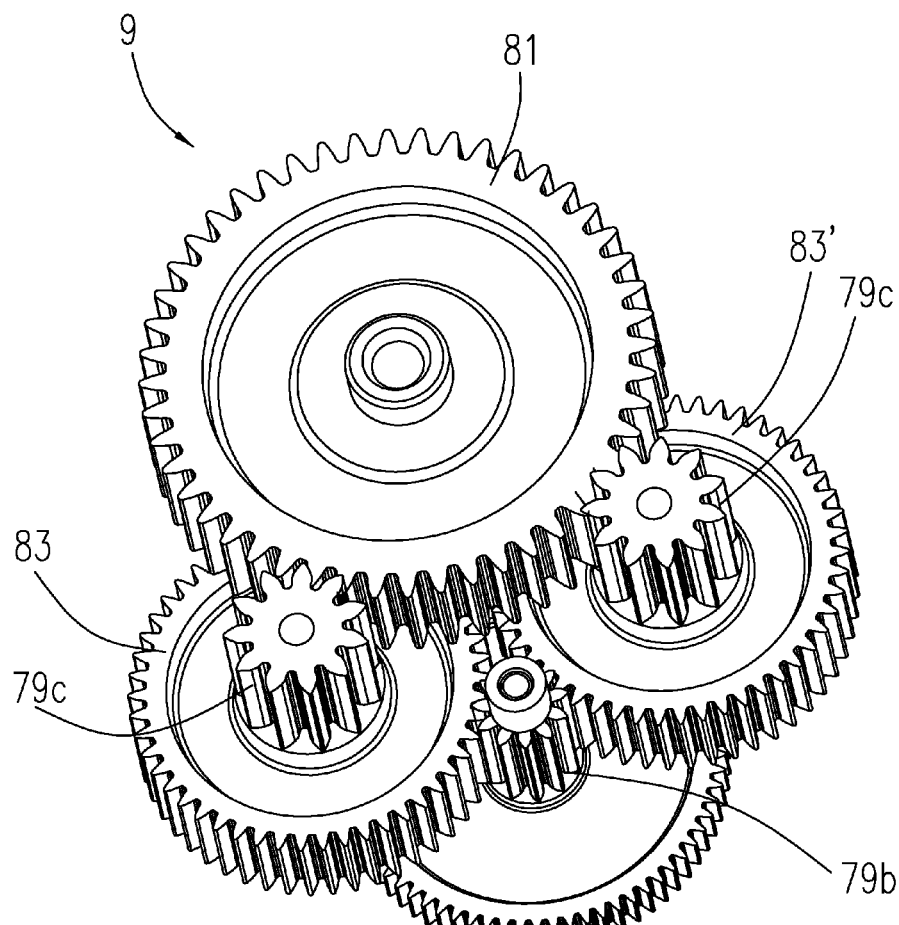

FIGS. 4 to 7 illustrate the drive unit of the actuator according to the present invention that is fitted with two gear wheels connected in parallel, here the double gear wheels 83, 83'. FIG. 4 shows an exploded view of the drive unit, FIG. 5 shows a view from below of the assembled drive unit of FIG. 4 and FIG. 6 shows a view from above of the assembled drive unit of FIG. 4. FIG. 7 shows a part of the gear train of the drive unit according to the invention, namely the last and the penultimate gear stage. Corresponding components in FIGS. 4 to 7 are indicated by the same reference numbers as in FIG. 1.

The drive unit of the actuator 1 comprises a series of double gear wheels that are indicated in FIGS. 4 to 7 by 79a, 79b and 79c. Each double gear wheels takes part in two gear stages, a first gear stage being formed between gear wheel 47' on the shaft of the electric motor and the first double gear wheel 79a, a second gear stage is formed between the first and the second double gear wheel 79a, 79b, a third gear stage is formed between the second double gear wheel and the third double gear wheel 79b and 79c and a fourth gear stage is formed between the third double gear wheel 79c and the output wheel 81. In the illustrated embodiment, the third double gear wheel 79c comprises two identical double gear wheels 83, 83' connected in parallel that mesh together with the second double gear wheel 79b to form the third gear stage, and with the output wheel 81 to form the fourth gear stage. The torque transmitted by the second double gear wheel 79b is thus evenly distributed over the two third double gear wheels 83, 83' and from these concentrated again to the output wheel 81.

As mentioned at the outset, increased torque occurs at the output wheel 81 for any specific load due to gear reduction in the respective gear stages, which necessitates designing the geometry and the material of the gear wheels at the output side to be correspondingly more robust so as to withstand the greater load. In practice, for example, in the last gear stage, i.e. from the third double gear wheel 79c to the output wheel 81, a torque can be transmitted which is ten times greater than the torque transmitted by the first stage. If we assume that due to cost considerations and in order to limit space requirements, each gear wheel is only designed to be as large and as stable as is required by the expected load in its gear stage, then for gear trains having only one gear wheel per stage, the gear wheels have to be designed with materials of varying resilience and/or with varying geometries; in particular, the gear wheel in the last stage has to be made of a particularly resilient material and/or with a reinforced gear geometry and a thicker shaft, so as to be able to transmit maximum torque in all possible applications. This results in increased manufacturing costs for the drive unit. If the drive unit is to be of use in different applications in which different nominal torques are to be transmitted, it always has to be designed to take the largest potential load. In contrast, the drive unit according to the invention allows high torque to be transmitted to the output wheel 81 and at the same time the load on the individual gear wheels 83, 83' of the last stage to be alleviated. When the two double gear wheels 83, 83' are used, they are driven in parallel by the previous double gear wheel 79b and they themselves in turn drive the output wheel 81 in parallel. This goes to halve the torque acting on the two double gear wheels 83, 83' and despite the lower load on the individual double gear wheels 83, 83', increased torque can accordingly be transmitted to the output wheel 81. This in turn makes it possible to use a comparably less robust and thus more cost-effective material as well as a smaller gear geometry, shaft diameter etc.

The invention also makes it possible for one of the double gear wheels 83, 83', for example the double gear wheel 83', to be subsequently removed from the gear unit 9 when there is no need for increased torque on the output side 81. The function of the drive unit 1 remains the same with the only difference being that with one double gear wheel 83 the maximum torque at the output side 81 is less. The gear unit 9 is thus particularly versatile in its application.

In an embodiment having a gear ratio of approximately 4 to 5 per gear stage and a rotational speed at the output side 81 of between 3 to 10 rpm having, for example, a double gear wheel 83 in the last stage on the output side 81, a nominal torque of approximately 1.2 Nm is transmitted and with two double gear wheels 83 and 83' a nominal torque of approximately 1.75 Nm is transmitted. This data is simply meant to provide an idea of the scale of magnitude of the gear unit according to the invention.

FIGS. 5 and 6 show a bottom view and a view from above of the actuator according to the invention, the same components as in the previously described figures being indicated by the same reference numbers and not described in detail again. In the embodiment of FIGS. 5 and 6 the drive unit in the last gear stage is fitted with two double gear wheels 83, 83'. It can clearly be seen from FIGS. 5 and 6 how the gear wheel 47' on the shaft 47 of the drive motor meshes with the larger gear wheel of the first double gear wheel 79a, so as to form the first gear stage, how the smaller gear wheel of the first double gear wheel 79a meshes with the larger gear wheel of the second double gear wheels 79b, so as to form the second gear stage, how the smaller gear wheel of the second double gear wheels 79b meshes with the larger gear wheels of the two double gear wheels 83, 83' connected in parallel, so as to form the third gear stage, and how the small gear wheels of the third double gear wheels 83, 83' connected in parallel mesh with the output wheel 81, so as to form the last gear stage. It can be easily seen that the drive unit also functions when one of the two parallel disposed double gear wheels 83, 83' of the last stage is removed. This is easily achieved thanks to the variable configuration of the actuator, since it is simply a matter of fitting the bearing supports 59 with one or with two axles 55d and accordingly with one or with two double gear wheels 83, 83'. In FIG. 7, the interaction of the second double gear wheel 79b, the two third double gear wheels 83, 83' connected in parallel and the output wheel 81 is shown again in a perspective view.

Plastics having a filler may be used as the materials, such as polyoxymethylene and various is types of polyamide. For the filling material, fiber glass, glass beads or mineral fillers are used, the stiffness of the double gear wheels 83, 83' varying according to the plastics or plastic mix used. In addition, polytetrafluoroethylene can be used for lubrication.

The characteristics revealed in the above description, the claims and the figures can be important for the realization of the invention in its various embodiments both individually and in any combination whatsoever.

IDENTIFICATION REFERENCE LIST

| | |
|---|---|
| 1 | Drive unit |
| 3 | Stator |
| 5 | Rotor |
| 7 | Circuit board |
| 9 | Gear unit |
| 11, 11' | Housing and cover |
| 13 | Can |
| 15 | Pins |
| 17 | Slot insulation |
| 19 | Flange |
| 21 | Mounting ear |
| 25 | Back yoke ring |
| 27 | Longitudinal groove |
| 29 | Depression |
| 31 | Bearing support |
| 33 | Recess |
| 35 | Projection |
| 37 | Bar |
| 39 | Opening |
| 41 | Connector pin |
| 43 | Magnet carrier |
| 45 | Permanent magnet |
| 47 | Shaft |
| 47' | Gear wheel |
| 49 | Opening |
| 53, 53', 53" | Double gear wheel |
| 53''' | Output wheel |
| 55a, 55b, 55c, 55d | Axles |
| 57 | Struts |
| 58 | Bearing support |
| 59 | Bearing support |
| 60 | Bearing support |
| 61 | Struts |
| 62 | Bearing support |
| 63 | Recess |
| 65 | First connecting element |
| 67 | Second connecting element |
| 69 | Rib |
| 71 | Edge of the recess |
| 73 | Projection |
| 75 | Chamfer |
| 77a, 77b | Wings |
| 79a, 79b, 79c | Double gear wheels |
| 81 | Output wheel |
| 83, 83' | Double gear wheel |

The invention claimed is:
1. An actuating drive for a flap actuator in a motor vehicle having a drive unit and a brushless DC motor as the electric motor whose outside circumference is less than or equal to 60 mm, the drive unit comprising:

a gear train having at least a first gear stage and a last gear stage, wherein the gear train realizes a transmission ratio of greater than one from the electric motor to an output wheel, wherein each gear stage is formed by a gear drive; and wherein in the last gear stage one gear wheel or two gear wheels connected in parallel are provided that each mesh with an upstream gear wheel of the gear train and with the output wheel so as to transmit the torque acting on the last gear stage to this stage via the one gear wheel or over the two gear wheels connected in parallel, wherein the drive unit is accommodated in a housing of the actuator that has at least a first and a second bearing support for the gear wheels of the last gear stage, and to form this last gear stage, the two bearing supports are fitted with the one gear wheel or with the two gear wheels connected in parallel.

2. A drive unit according to claim 1 that is configured such that the output wheel rotates more slowly than the gear wheel or the gear wheels respectively of the last gear stage.

3. A drive unit according to claim 1, wherein the gear wheels form a spur gear unit.

4. A drive unit according to claim 1, wherein the two gear wheels connected in parallel of the last gear stage are identical.

5. A drive unit according to claim 1, wherein the housing of the actuator is designed to receive the entire gear train and to position the gear wheels of the gear stages with respect to one another and with respect to the electric motor.

6. A drive unit according to claim 1, wherein bearing supports for supporting the gear wheels of the gear stages are formed on the inner wall of the housing of the actuator.

7. A drive unit according to claim 6, wherein the bearing supports comprise pins on to which the gear wheels are placed.

8. A drive unit according to claim 1, wherein means of fastening, particularly pins for positioning and fixing other functional units such as a circuit board are integrally molded to the housing of the actuator.

9. A drive unit according to claim 1, wherein a can is integrally molded to an inner face of the housing of the actuator, the can being designed to receive the electric motor, and wherein means of fastening are integrally molded to the can that are designed to position and fix the electric motor accommodated in the can.

10. A drive unit according to claim 1, wherein the gear train is configured such that each gear stage realizes a transmission ratio of 2 to 8, or 4 to 5.

11. A drive unit according to claim 10, wherein the electric motor has a shaft having a gear wheel that meshes with a gear wheel of the first gear stage.

12. The actuating device according to claim 1, wherein the outside circumference is less than or equal to 30 mm.

* * * * *